C. O. PEARSON.
ELEVATOR.
APPLICATION FILED OCT. 12, 1908.

985,698.

Patented Feb. 28, 1911.

C. O. PEARSON.
ELEVATOR.
APPLICATION FILED OCT. 12, 1908.

985,698.

Patented Feb. 28, 1911.
5 SHEETS—SHEET 2.

WITNESSES:

INVENTOR
Charles O. Pearson
BY
E. W. Marshall
ATTORNEY

C. O. PEARSON.
ELEVATOR.
APPLICATION FILED OCT. 12, 1908.

985,698.

Patented Feb. 28, 1911.
5 SHEETS—SHEET 3.

WITNESSES:

INVENTOR
Charles O. Pearson
BY
E. W. Marshall
ATTORNEY

C. O. PEARSON.
ELEVATOR.
APPLICATION FILED OCT. 12, 1908.

985,698.

Patented Feb. 28, 1911.
5 SHEETS—SHEET 4.

WITNESSES:
L. A. Klimek

INVENTOR
Charles O. Pearson
BY
E. W. Marshall
ATTORNEY

UNITED STATES PATENT OFFICE.

CHARLES O. PEARSON, OF NEW YORK, N. Y., ASSIGNOR TO OTIS ELEVATOR COMPANY, OF NEW YORK, N. Y., A CORPORATION OF NEW JERSEY.

ELEVATOR.

985,698.  Specification of Letters Patent. Patented Feb. 28, 1911.

Application filed October 12, 1908. Serial No. 457,348.

*To all whom it may concern:*

Be it known that I, CHARLES O. PEARSON, a citizen of the United States, and a resident of the city of New York, in the county and State of New York, United States of America, have invented certain new and useful Improvements in Elevators, of which the following is a specification.

My invention relates to new and useful improvements in elevators, and its object is to provide an elevator apparatus driven by the power generated by an internal combustion engine, together with a control system for the elevator and for its driving engine, which system is actuated by a supply of energy generated by the engine itself.

To these ends my invention resides in the construction and arrangement of parts which will be described in the following specification, and the novel features of which will be set forth in the appended claims.

Referring to the drawings, Fig. 8 shows the top of the engine cylinders in side elevation with their sparking mechanism above them shown in section. Fig. 9 is an end elevation, partly in section, of one of the engine cylinders and its connected sparking mechanism. Fig. 10 is a plan view of a device for controlling the sparking mechanism. In Fig. 11 the clutch and brake mechanism used is shown in sectional side elevation, and in Fig. 12 a sectional end view of the clutch is shown.

Like characters of reference designate corresponding parts in all of the figures.

10 designates the foundation upon which certain of the parts which I am about to describe are mounted.

20 is an explosive or internal combustion engine which may be of any preferred form or construction. In this particular case it is shown as a three-cylinder two-cycle engine of which 21 is the intake or supply pipe and 22 the exhaust pipe which is connected with a muffler 23.

24 is the shaft of the engine 20.

Figure 17:
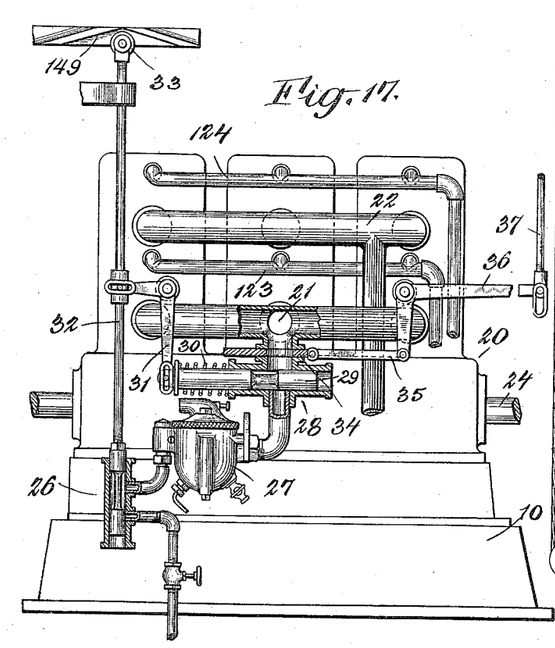
Fig. 17 shows the engine and some of its connected mechanism in side elevation, with parts of the valves and their connections broken away to show their construction. A sectional plan view of a speed controlling valve is shown in Fig. 18. One of the ways in which the starting device may be connected with the engine is shown in Fig. 19.
Figure 18:
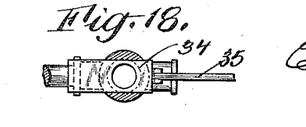
Figure 19:
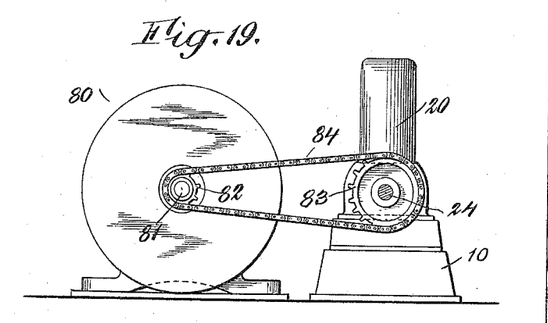

25 is a gasolene tank which is connected through a valve 26 with the carbureter 27, and the latter is connected through a manually controlled throttle valve 28 and an automatically actuated speed-control valve 34 with the intake of the engine. These valves are shown clearly in Figs. 17 and 18. The throttle valve 28 is provided with a piston 29 which is pushed to the left by a spring 30 to partly close the passage from the carbureter to the engine, and which is connected by a bell crank lever 31 with a vertical rod 32 which is attached to the piston of the gasolene valve 26, and which carries at its upper end an antifriction roller 33. The manner in which the parts are controlled will be fully set forth hereinafter.

34 is a slide valve interposed in the passage between the carbureter and the intake of the engine, and is connected by a link 35 and a bell crank lever 36 with a vertical rod 37. A lost motion connection is provided between the rod 37 and the lever 36. The rod 37 is controlled by a centrifugal governor 38 on a vertical rod 52 which is connected with and driven by the engine shaft 24 by means of a pair of bevel gears 39.

40 designates an electric battery. One of its leads is connected with a spark coil 41, and through this coil and conductor 42 is grounded to the framework of the engine. Its other lead is designated by 43 and is connected to a stationary contact brush 44. 45 is a similar contact brush insulated from the brush 44 and connected by a conductor 46 with one of the insulated spark pins 47 in each of the engine cylinders as shown in Fig. 9.

Figures 8, 9, 10, 11, 12:
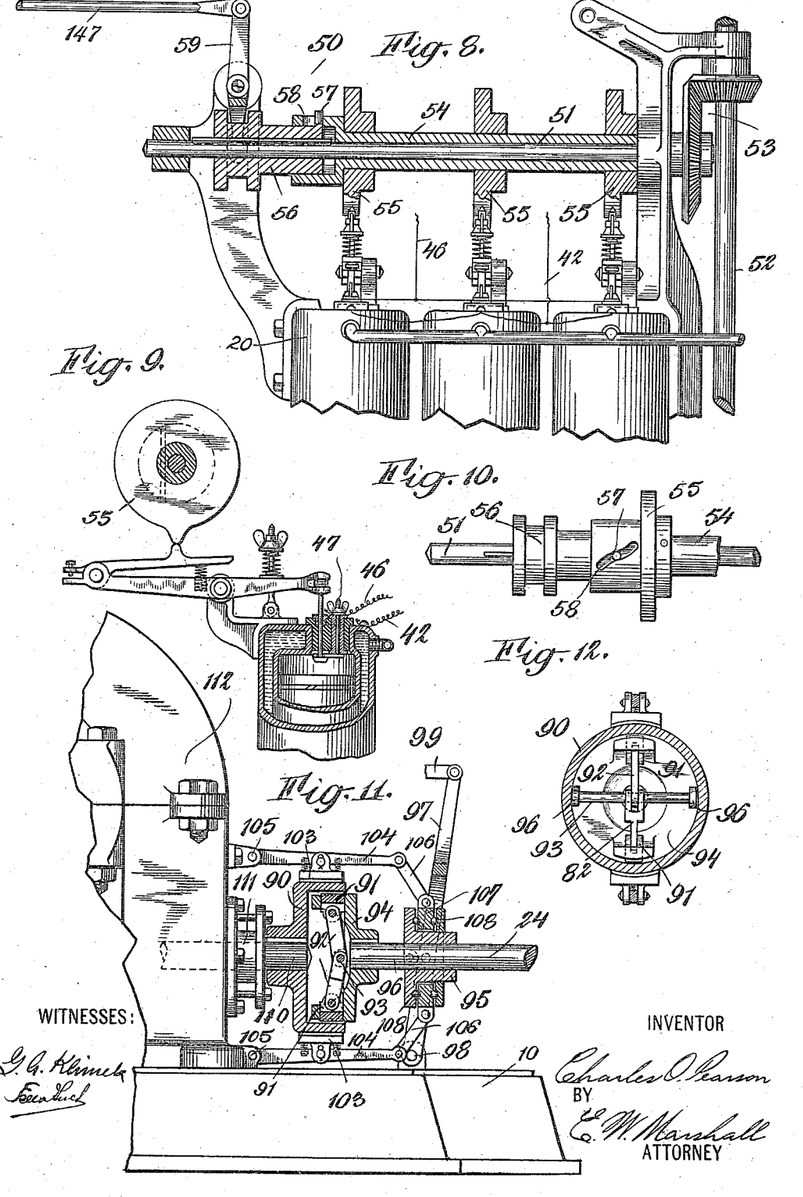
Figures 13, 14:
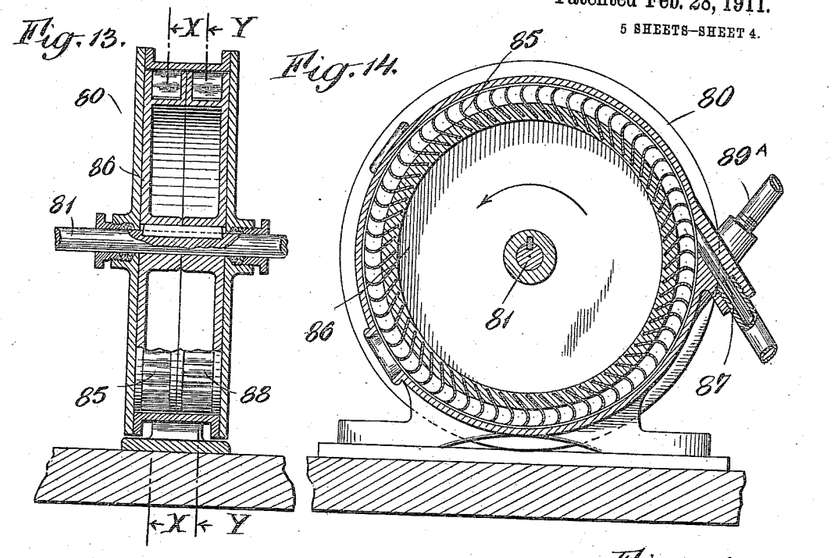
Figs. 13 and 14, are, respectively, sectional side and end elevations of a fluid pressure starting device for the engine. The section shown in Fig. 14 is taken on the line X—X of Fig. 13.

The sparking mechanism is designated in the drawings by 50 and is shown somewhat in detail in Figs. 8, 9 and 10. From Fig. 10 it may be seen that this is an ordinary make and break device, the parts of which I will not specifically point out as they form no part of the present invention, but I will describe its actuating mechanism in the manner in which it may be controlled.

51 is a shaft rotated by the engine through the vertical rod 52 by bevel gears 53. 54 is a sleeve upon this shaft 51 which carries an actuating cam 55 over each of the cylinders.

56 is a collar upon shaft 51 arranged to rotate with the shaft but longitudinally slidable thereon.

57 is a pin projecting from the collar 56 through a slot 58 in the sleeve 54 which is of the peculiar shape shown in Fig. 10.

A lever 59 is arranged to move the collar 56 back and forth to thereby rotate the sleeve 54 and the actuating cams relative to the collar 56 to thereby advance or retard the action of the sparking mechanism relative to the movement of the engine piston.

The pressure pump is designated by 60. This comprises a cylinder 61 within which is a piston 62 driven by an eccentric 63 on the engine shaft 24.

64 is an air inlet, and 65 a pressure tank. 66 designates a pressure pipe leading to a manually controlled valve in the elevator-car, and through this valve to various parts of the control mechanism which will be fully described later. 67 is another pressure supply pipe leading to the controlling valves.

Figures 15, 16:
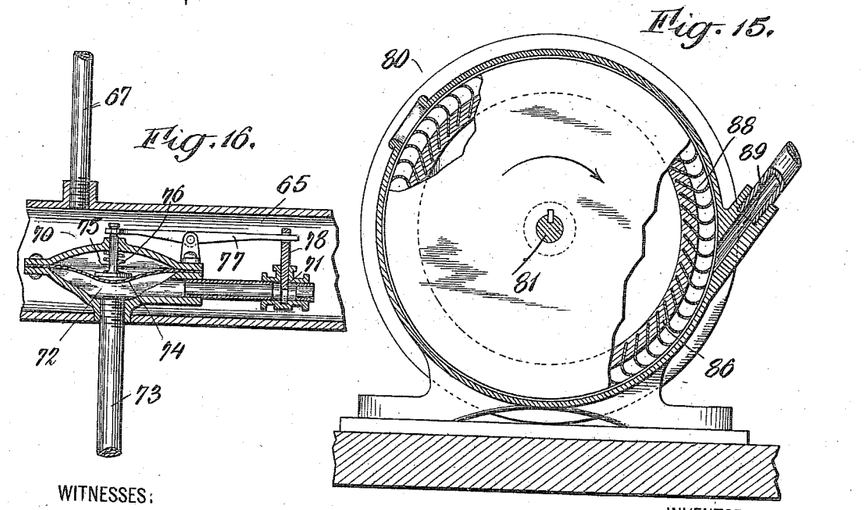
Fig. 15 shows another end elevation of the starting device with parts broken away to show the arrangement of the parts on the line Y—Y of Fig. 13.
Fig. 16 is a sectional side elevation of a fluid pressure regulator.

70 is a pressure regulator controlling the passage of fluid pressure from the tank 65 to the gasolene tank 25. This is shown in Fig. 16, in which it may be seen that 71 is a valve controlling a passage into a chamber 72 and to pipe 73 which leads to the gasolene tank. 74 is a diaphram forming the top of chamber 72 and pressed downward by a spring 75 acting upon a plunger 76. The plunger 76 is connected with a lever 77, the other end of which is connected with a sliding member 78 of the valve 71. When the pressure within chamber 72 and the gasolene tank has reached a desired amount, the member 78 will be pushed down to close the valve 75 and the passage to the gasolene tank. 79 is an inlet pipe through which the gasolene tank may be filled. A similar pressure regulator device may be interposed between the pump 60 and the pressure tank 65 if desired. As the gasolene tank is supplied with pressure whereby the gasolene may be forced up to the engine, the tank itself may be placed under the ground or in any other safe position.

The form of starting device 80 which is shown in Figs. 13, 14, 15 and 19 is a reversible fluid pressure turbine. 81 is its shaft upon which is affixed a sprocket-wheel 82. 83 is a sprocket-wheel affixed to the engine shaft 24. The sprocket-chain 84 runs over these two sprocket-wheels and connects the starting device and the engine together. 85 designates a plurality of impact blades mounted upon the periphery of a wheel 86 which is affixed to the shaft 81. 87 is a port through which fluid is arranged to flow under pressure against the blades 85 to impart rotation to the wheel 86 and to the shaft 81 in the direction indicated by the arrow in Fig. 14, and on the left-hand portion of the casing in Fig. 1. 88 designates another set of impact blades affixed to another portion of the periphery of wheel 86 or upon a similar wheel mounted upon the shaft 81. These blades are set in the opposite direction and are arranged to drive the shaft 81 in the opposite direction or that indicated by the arrow in Fig. 15, and on the right-hand portion of the casing in Fig. 1, when pressure is admitted through the port 89. The ports 87 and 89 are connected by supply pipes 87ᴬ and 89ᴬ with a controlling valve which I will describe later. It is evident that any movement imparted to the shaft 81 will be transmitted to the engine shaft 24 through the connecting mechanism but at a reduced rate of speed.

Figures 1, 2, 3, 4:
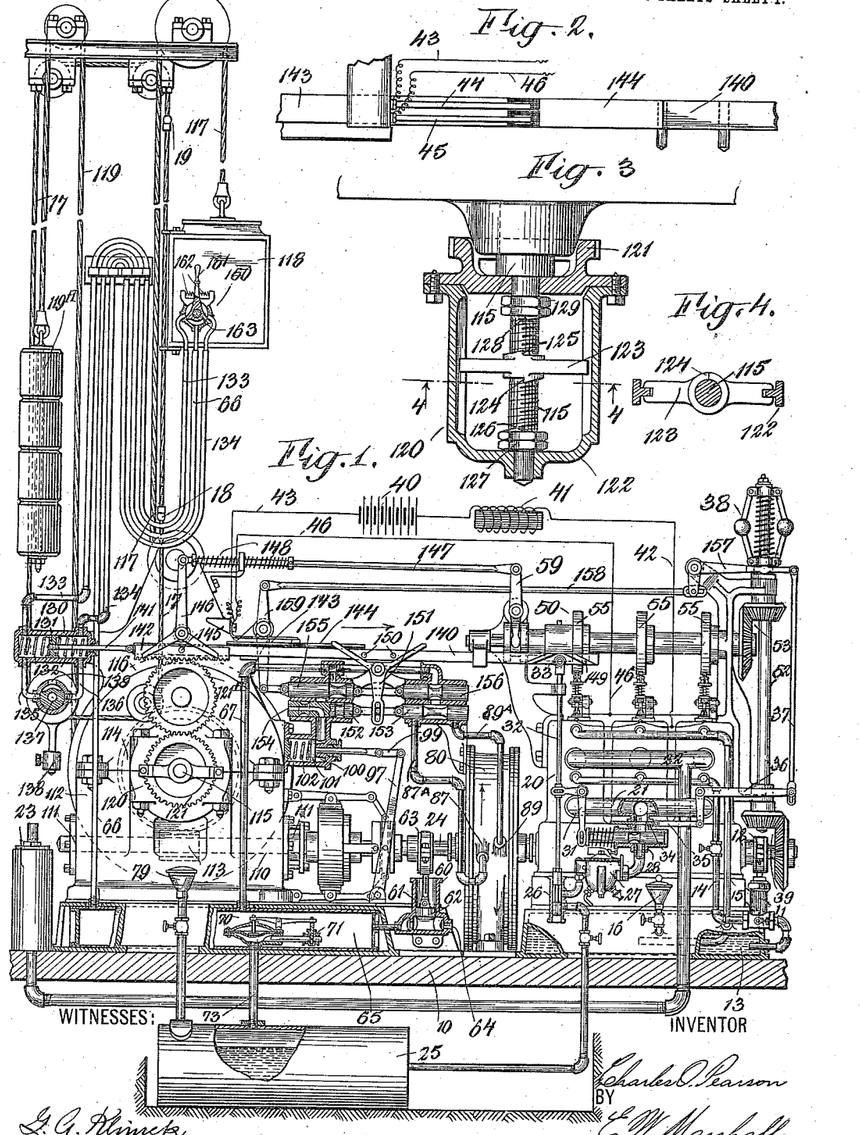
Figure 1 is a side elevation, partly in section, of an elevator apparatus and its connected mechanism made according to my invention.
Fig. 2 is a detail of the controlling system, this figure being a plan view of a circuit closer for controlling the circuits to the sparking mechanism for the engine.
Fig. 3 is a plan view of an automatic stop-motion device which is controlled by the movements of the hoisting apparatus.
Fig. 4 is a sectional end view of a part of this stop-motion device, the section being taken on the line 4—4 of Fig. 3.
Figures 5, 6, 7:
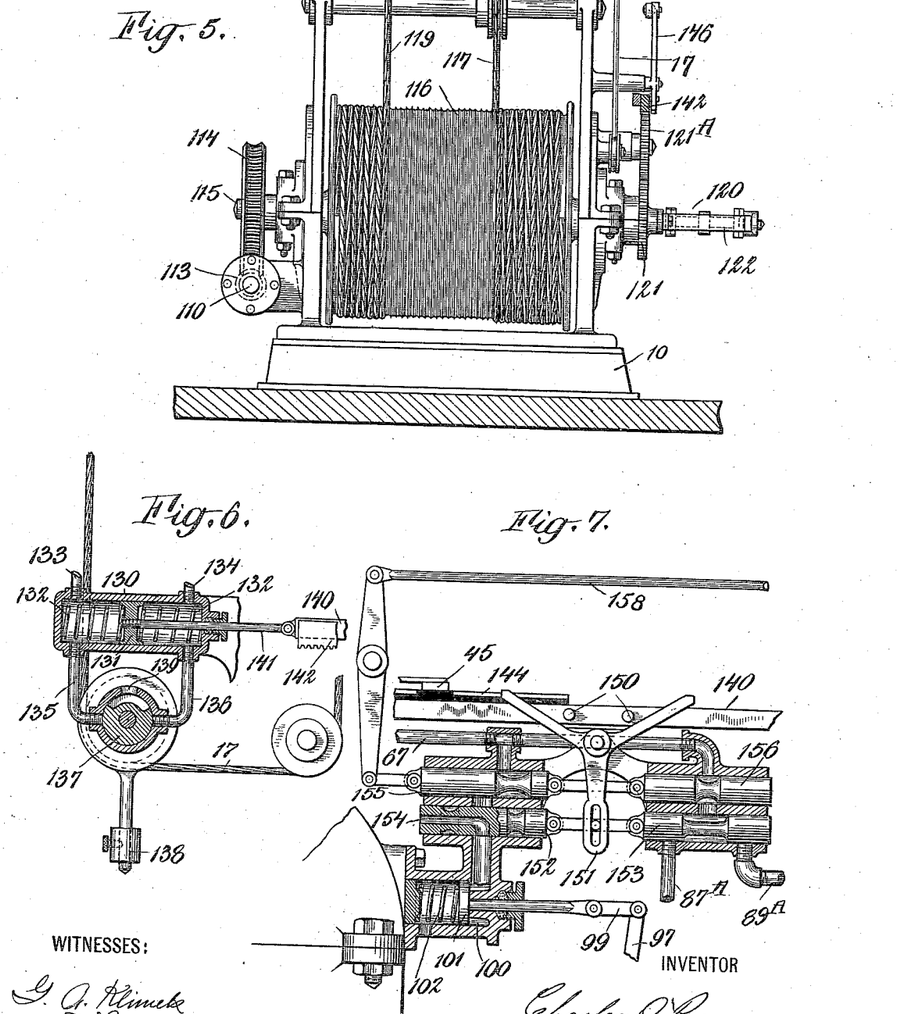
Fig. 5 is an end elevation of the hoisting drum and some of its connected parts.
Fig. 6 is a sectional front view of an automatic stop-valve which is a part of the control system.
In Fig. 7 some of the actuating and controlling valves are shown in section and some in detail.

In Figs. 1, 11 and 12 a fluid pressure controlled brake and clutch device, which may be used in carrying out the invention, is illustrated. This comprises a circular housing 90 rigidly mounted upon a shaft 110 which is in alinement with the engine shaft 24. 91, 91 designate a pair of friction members which are connected together by a pair of toggle levers 92, which levers are connected together by a rod 93. 94 is a clutch member affixed to the end of the engine shaft and arranged to carry the friction members and their connecting parts. 95 is a collar slidably mounted upon shaft 24 and connected with the toggle levers by means of a pair of links 96 and the rod 93. 97 designates a lever which is pivoted at 98 and arranged to slide the collar 95 back and forth on the shaft to thereby throw the friction members out of and into engagement with the housing 90. 99 is an actuating rod for the lever 97. 100 is an actuating cylinder within which is a piston 101, the rod of which is connected by the actuating rod 99 with the lever 97. 102 is a compression spring arranged to push the piston 101 outward to move the lever 97 to release the clutch. This cylinder is controlled by the fluid pressure through the valves which will be fully described later in this specification. 103, 103 are brake-shoes adapted to engage with the outer periphery of the housing 90. These are supported upon brake-levers 104 which are pivoted at 105, and the outer ends of which are connected by links 106 with a disk 107 within the collar 95. As the collar rotates with the shaft 24 and the disk 107 does not rotate, antifriction bearings 108 may be interposed between these two parts. The disk 107 also forms intermediary means for connecting the lever 97 with the collar. The connections between the brake-shoes and the lever 97 above described are such that when the lever is moved back to release the clutch it will at the same time apply the brake-shoes to the housing 90. The brake-shoes will also be released whenever the clutch is thrown into engagement with the housing, and both of these operations are controlled by the single actuating cylinder 100.

The shaft 110 upon which the housing is mounted is a part of the elevator hoisting mechanism. This shaft is supported by bearings 111, 111 upon the ends of a casing 112. A worm-gear 113 is affixed to the shaft 110. A gear-wheel 114 is in mesh with the worm 113. This gear and a winding drum 116 are both rigidly mounted upon the shaft 115 which is supported in bearings upon the casing 112. A rope or cable 117 which is affixed to the drum 116 and is wound upon the latter, is carried up over suitable guiding and supporting sheaves to an elevator-car 118. Similarly, another rope or cable 119, which passes about the drum in the opposite direction, connects the drum and a counter-weight 119ᴬ.

120 designates an automatic stop-device actuated by the movement of the drum 116. This comprises a gear 121 which is loosely mounted upon the end of drum shaft 115. This gear carries a yoke 122 which, during the greater part of the car's run, is held against rotation. Within this yoke and guided thereby, is a threaded traveling member 123 which fits over the end of shaft 115 which is threaded for this purpose. The traveling member is provided with projecting lugs 124 and 125. 126 is a similar lug upon a nut on shaft 115, which may be rotated for the purpose of adjusting its position on the shaft, and may be held in place by lock-nut 127. Another lug 128 is provided on a nut on the shaft 115 on the opposite side of the traveling member 123. 129 is a locking nut arranged to engage with this nut to hold it in place.

When the shaft 115 is rotated to rotate the drum and to cause the car to move up or down, the traveling member will move in or out upon the threaded end of the shaft. If the parts are connected in the manner shown in the drawings, the rotation of the drum to move the car up will cause the traveling member to move outward. This outward movement will continue until the lugs 124 and 126 engage with each other. Any further rotation of shaft 115 will be imparted by the two ends through these lugs and through the traveling member to the yoke 122 and the gear 121 to which it is attached. As this operation is to actuate mechanism for the purpose of stopping the car at the upper end of its run, the stop-nuts should be so adjusted as to bring the lugs 124 and 126 together when the car has reached a point near and at a predetermined distance from the end of its travel. The lugs 125 and 128 are similarly brought together when the car reaches a point near the lower limit of its travel to impart rotation to the gear 121 in the opposite direction.

11 is a water supply pump for the cooling jacket of the engine. It is driven by an eccentric 12 upon the engine shaft 24 and is arranged to drive water from a supply tank 13 under the base of the engine to the water jacket through a pipe 14.

15 is the return from the water jacket to the supply tank, and 16 is an inlet through which this tank may be filled.

130 is the cylinder of the main controlling valve. 131 is its piston against which centering springs 132, act. 133 and 134 are pressure supply pipes which lead to the ends of this cylinder. 135 and 136 are relief pipes from the ends of this cylinder which lead to a rotary automatic relief valve 137 which is normally held in central or closed position by a weighted arm 138, but which will connect the pipe 145 or the pipe 136 with an exhaust port 139, when moved to the right or left, respectively. 17 is a rope passing over an actuating sheave on this valve and run up the elevator shaft. Stop balls 18 and 19 are affixed to this rope at such points that the car will strike against them as it nears the top or bottom of its travel and will move the rope and actuate the valve to move its weighted arm to the right or to the left for a purpose which will later appear more clearly.

140 is a sliding controlling rod connected with piston 131 by a rod 141. 142 is a toothed rack upon this operating rod which is in mesh with a gear 121ᴬ and, through the latter, connected with the automatic stop-motion mechanism 120.

143 is a contact plate insulated from but mounted upon the rod 140 and arranged to be moved under and to connect stationary contacts 44 and 45 when the rod is moved to the right. 144 is another contact plate arranged to connect these stationary contacts when the rod is moved to the left.

145 is a pin projecting from the side of rod 140 and arranged to engage with a forked lever 146 to move the latter to one side or the other when the operating rod is moved, to thereby shift a rod 147 to one side or the other, as the case may be. Centering springs 148 are provided for the rod 147 which is connected, as shown, with the upper end of lever 59 and is so arranged that it will shift the sparking mechanism to advance the spark of the engine whenever the latter is started in either direction.

149 is a cam upon the end of the operating rod 140 directly above the roller 33 on the vertical rod 32 and so arranged that when the rod 140 is shifted to either side it will depress the rod 32 and this, through its connections previously described, will open the gasolene supply to the carbureter and open the throttle valve 28.

At 150 two pins are shown projecting from the sides of the operating rod. These are arranged to act upon a pivoted forked lever 151 to open two piston valves 152 and 153 when the rod 140 has moved to one side or the other. These valves in conjunction with the piston valves 155 and 156 control the fluid pressure to the brake and clutch actuating cylinder 100, and the starting device 80, respectively.

The fluid pressure is admitted through pipe 67, valves 156 and 153, when the operating rod is moved to the right, pipe 87 which leads to the starting device, to start the elevator in its upward direction. The pressure will then rotate the starting device and the engine in the required direction. Similarly, if the rod 140 is moved to the left, a pipe 89 will lead the fluid under pressure to the other side of the starting device, which will then drive the engine in the opposite direction. The engine will now draw in an explosive mixture, and as the battery 40 is connected with the sparking mechanism at the contact brushes 44 and 45, this charge will be ignited and the engine will be impelled thereby so that it will run under its own power. The centrifugal governor will then be driven by the engine and, through the sliding valve 34 and the connections previously pointed out, will prevent the engine from attaining an excessive speed. The centrifugal governor is also connected by the bell crank lever 157 and the rod 158 through a lost motion connection and a lever 159 with the valves 155 and 156.

When the engine has reached a predetermined speed, these two valves will be automatically pulled over to the left. This will accomplish two results. In the first place, the valve 156 will shut off the fluid pressure supply from the starting device, and in the second place, the valve 155 will open a passage between the fluid pressure supply pipe 67 through valve 152 to the cylinder 100. The piston in the latter will then be pushed back to throw in the clutch and to release the brake so that the engine 20 will drive the hoisting mechanism and the car. This operation will be continued until the operating rod is moved back to its central position, in which case the battery will be disconnected from the sparking mechanism, and the valve 152 will open the connection between the cylinder 100 and an exhaust port 154, thus releasing the piston 101 and allowing the spring 102 to release the clutch and apply the brakes. I will now point out the manner in which this starting and stopping of the engine and the car is controlled both manually and automatically.

160 is a manually operated valve in the car 118, which valve comprises a lever 161 self-centered by springs 162. When the lever 161 is moved over to the right it will move a rotary valve member 163 into such a position as to connect the pipes 66 and 133 together and will open the pipe 134 to exhaust. This will cause the fluid under pressure to enter the left-hand end of cylinder 130 to push its piston 131 and the operating rod 140 over to the right to start the engine in the direction to hoist the car. The acceleration and the speed of these parts will be automatically controlled by the devices described. The operator may at any time allow the hand lever 161 to return to its central position when cylinder 130 will be deenergized and its piston returned to its central position by one of the springs 132. The parts will then be returned to their original positions to cut off the battery and the gasolene supply, to release the clutch, and apply the brake so that the hoisting mechanism and the car and the engine will come to rest. This operation of stopping may also be accomplished automatically when the car approaches the upper limit of its travel by the car striking the stop ball 19 on the rope 17 and moving the rope in such a way as to open the left-hand end of cylinder 130 to the air through pipe 135 and valve 137; or, if the automatic stop mechanism 120 is set in motion by the car as it approaches its upper limit of travel, the rotation of the gear 121 will move the operating rod 140 back to its central position through the intermediate gear 121 and the rack 141. Obviously, the car may be started down by moving the valve lever 161 to the left and these automatic operations will take place in a similar manner when the car is running down and approaches the lower limit of its travel.

Figure 20:
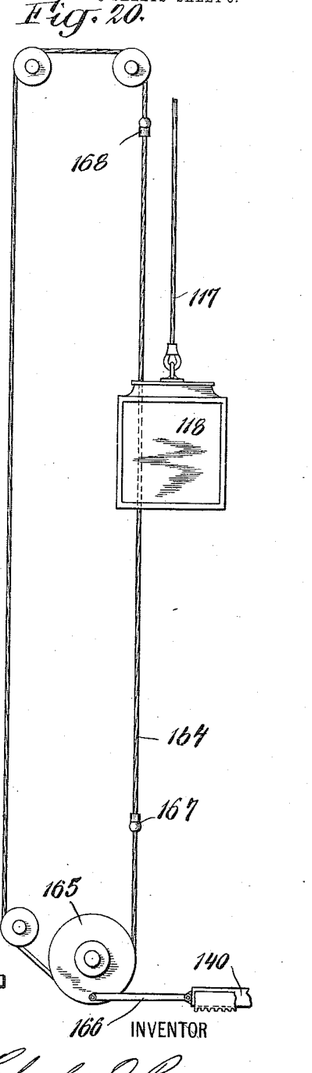
Fig. 20 is a diagrammatic representation of the car with its hoisting rope and an arrangement of a controlling cable connected with parts of the operating mechanism.

In Fig. 20 a hand rope 164 is shown running through the car and connected by a sheave 165 and a link 166 to the operating rod 140. In this case the rod 140 may be manually shifted by means of the rope 164. The stop balls 167 and 168 are provided for the purpose of supplying an additional means for automatically stopping the car at the end of its run.

With the invention herein described it is possible for the first time to drive an elevator by an internal combustion engine which may be started and stopped with the car and from the car. The energy for actuating the control system for the engine is generated by the engine itself and broadly may be any form of energy which may be conveniently stored. This invention therefore provides a new type of elevator and opens a new field for internal combustion engines. The control of the car and of the engine is accomplished in a simple manner without the need of skilled operators, and is amply protected by automatic safety stop arrangements.

What I claim is:—

1. An elevator hoisting apparatus, a car, an internal combustion engine, and fluid pressure means for starting the engine and controlling the speed thereof from the car.

2. An elevator hoisting apparatus, a car, an internal combustion engine, and fluid pressure means for starting the engine in either direction, stopping the engine and controlling the speed thereof from the car.

3. An elevator hoisting apparatus, a car, an internal combustion engine, a starting device therefor, means driven by said engine for obtaining a fluid pressure supply, and manually operated means in the car for actuating the starting device and for controlling the speed of the engine by means of said fluid pressure.

4. An elevator hoisting apparatus, a car, an internal combustion engine, a pressure pump arranged to be driven thereby, a starting device for starting the engine in either direction, and a manually operated valve in the car arranged to direct the pressure and to cause said pressure to actuate the starting device.

5. An elevator hoisting apparatus, a car, an internal combustion engine, a centrifugal governor arranged to automatically control the speed thereof, a throttle valve for the engine, and means for actuating said throttle valve from the car.

6. An elevator hoisting apparatus, a car, an internal combustion engine, means for controlling the engine, means for connecting said apparatus with the engine, and fluid pressure means for together actuating the engine controlling means and the connecting means from the car.

7. An elevator hoisting apparatus, a car, an internal combustion engine, a starting device therefor, a clutch for connecting and disconnecting said apparatus with and from the engine, fluid pressure means for actuating the starting device and the clutch, and a valve in the car for controlling said fluid pressure means.

8. An elevator hoisting apparatus, a car, an internal combustion engine, fluid pressure means for starting the engine and controlling the speed thereof, a clutch arranged to connect and disconnect said apparatus with and from the engine, a brake for said apparatus, and a manually operated valve in the car for actuating the engine controller, the clutch and the brake.

9. An elevator hoisting apparatus having a shaft, a car, an internal combustion engine having a shaft in alinement with said elevator apparatus shaft, a starting device for the engine, a pressure pump driven by the engine, a clutch arranged to connect and disconnect said shafts with and from each other, a brake arranged to act upon said clutch, and a manually operated switch in the car for controlling the pressure generated by said pump, and causing said pressure to actuate the starting device, the clutch and the brake.

10. An elevator hoisting apparatus, a car, an internal combustion engine, a pressure pump arranged to be driven thereby, a starting device for starting the engine in either direction, a throttle valve and a spark mechanism for controlling the speed of the engine, a clutch and a brake for said apparatus, and a manually operated valve in the car arranged to direct the pressure to cause said pressure to actuate the starting device, the throttle valve, the spark mechanism, and the clutch, and to release the brake.

11. An elevator hoisting apparatus, a car, an internal combustion engine, means driven by the engine for generating a fluid pressure supply, a reversible fluid pressure motor positively connected with the engine, and manual means in the car for connecting and disconnecting the fluid pressure with and from the motor to cause said motor to start the engine in either direction, and to assist the engine in starting the apparatus.

12. An elevator hoisting apparatus, a car, an internal combustion engine, a pressure pump connected therewith, a reversible fluid pressure turbine directly connected with the engine, a sparking device for the engine, a throttle valve, a shifting mechanism for the sparking device, and a manually operated valve in the car arranged to direct the pressure generated by the pump, and to cause said pressure to actuate the turbine, the throttle valve, and the spark-shifting mechanism.

13. An elevator hoisting apparatus, a car, an internal combustion engine, a fluid pressure starting device therefor, means driven by the engine for obtaining a fluid pressure supply, manually operated means in the car for actuating the starting device, and automatic means for cutting off said starting device after the engine has attained a predetermined speed.

14. An elevator hoisting apparatus, a car, an internal combustion engine, a pressure pump connected therewith, a reversible fluid pressure turbine directly connected with the engine, a sparking mechanism for the engine, a throttle valve, a shifting device for the sparking mechanism, a manually operated valve in the car arranged to direct the pressure generated by the pump to cause said pressure to actuate the turbine, the throttle valve, and the spark-shifting mechanism, flexible tubes leading to said car valve, a speed-controlling valve, and a centrifugal governor arranged to actuate the speed-controlling valve and to cut off the fluid pressure from the starting device when the engine has attained a predetermined speed.

15. An elevator hoisting apparatus, a car, an internal combustion engine, a fluid pressure control system, and automatic means for stopping said apparatus and engine when the car nears the ends of its path of travel.

16. An elevator hoisting apparatus, an internal combustion engine, a fluid pressure system comprising a controlling rod, manual means for shifting said rod for starting and stopping the elevator, and means automatically actuated by the movement of the apparatus for shifting said rod to stop the elevator at predetermined points.

17. An elevator hoisting apparatus, a car, an internal combustion engine, a fluid pressure control system comprising a controlling rod, manual means for shifting the rod to start and stop the elevator, means actuated by the movement of said apparatus and other means actuated by the movement of the car for automatically shifting said rod to stop the engine and the hoisting apparatus when the car nears the ends of its path of travel.

18. An elevator hoisting apparatus, a car, an internal combustion engine, a fluid pressure control system comprising a controlling rod, fluid pressure means for shifting said controlling rod to start and stop the elevator, and a manually controlled valve in the car for controlling said shifting means.

19. An elevator hoisting apparatus, a car, an internal combustion engine, a fluid pressure control system comprising a controlling rod, fluid pressure means for shifting said controlling rod to start and stop the elevator, a manually controlled valve in the car for controlling said shifting means, and means actuated by the movement of the car for automatically releasing said fluid pressure shifting means to stop said apparatus and engine when the car nears the ends of its path of travel.

20. An elevator hoisting apparatus, a car, an internal combustion engine, a fluid pressure control system comprising a controlling rod, fluid pressure means for shifting said controlling rod to start and stop the elevator, a manually controlled valve in the car for controlling said shifting means, means automatically actuated by the movement of said apparatus for positively shifting the controlling rod, and means actuated by the movement of the car for automatically releasing said fluid pressure shifting means to stop said apparatus and engine when the car nears the ends of its path of travel.

21. An elevator hoisting apparatus, a car, an internal combustion engine, a pressure pump driven by the engine, a fluid pressure control system comprising a starting device for the engine, a spark ignition mechanism, and a controlling rod arranged to control the starting device and the current supply for the ignition mechanism; fluid pressure means for shifting said controlling rod to start and stop the elevator, and a manually operated valve in the car for controlling the shifting means.

22. An elevator hoisting apparatus, a car, an internal combustion engine, a pressure pump driven by the engine, a fluid pressure control system comprising a starting device for the engine, a spark ignition mechanism, means for advancing said ignition mechanism, and a controlling rod arranged to control the starting device, the current supply for the ignition mechanism, and the ignition mechanism advancing means; fluid pressure means for shifting said rod to start and stop the elevator, a manually operated valve in the car for controlling the shifting means, and flexible tubes running to said car-valve.

23. An elevator hoisting apparatus, a car, an internal combustion engine, a pressure pump driven by the engine, a clutch for connecting the engine with the hoisting apparatus, a fluid pressure control system comprising a starting device for the engine, a spark ignition mechanism, means for advancing said ignition mechanism, valves for the starting device, a valve for the clutch, and a controlling rod arranged to control the starting device valves, the clutch valve, the current supply for the ignition mechanism, and the ignition mechanism advancing means; a fluid pressure cylinder and a piston arranged to shift said controlling rod to start and stop the elevator, and a manually operated valve in the car for controlling said cylinder and piston.

24. An elevator hoisting apparatus, a car, an internal combustion engine, a pressure pump driven by the engine, a speed control valve, a centrifugal governor arranged to actuate said speed control valve, a clutch for connecting the engine with the hoisting apparatus, a brake for the hoisting apparatus, a fluid pressure control system comprising a reversible starting device for the engine, a spark ignition mechanism, means for advancing said ignition mechanism, valves for the starting device, a valve for the clutch and the brake, and a controlling rod arranged to control the starting device valves, the clutch and the brake valve, the current supply for the ignition mechanism and the ignition mechanism advancing means; a fluid pressure cylinder and piston arranged to shift said controlling rod to start and stop the elevator, and a manually operated valve in the car for admitting pressure to said cylinder to actuate the controlling rod.

25. An elevator hoisting apparatus, a car, an internal combustion engine, a pressure pump driven by the engine, a speed control valve, a centrifugal governor arranged to actuate said speed control valve, a clutch for connecting the engine with the hoisting apparatus, a brake for the hoisting apparatus, a fluid pressure control system comprising a reversible starting device for the engine, a fuel supply for the engine, and a valve controlling said fuel supply; a spark ignition mechanism, means for advancing said ignition mechanism, valves for the starting device, a valve for the clutch and brake, and a controlling rod arranged to control the starting device valves, the clutch and brake valve, the current supply for the ignition mechanism, the ignition mechanism advancing means, and fuel supply valve; a fluid pressure cylinder and piston arranged to shift said controlling rod to start the elevator, springs arranged to return the controlling rod to its central position to stop the elevator, a manually operated valve in the car for admitting pressure to said cylinder to actuate the controlling rod, and flexible tubes running to said car valve.

26. An elevator hoisting apparatus, a car, an internal combustion engine, a pressure pump driven by the engine, a fluid pressure control system comprising a starting device for the engine, a spark ignition mechanism, means for advancing said ignition mechanism, and a controlling rod arranged to control the starting device, the current supply for the ignition mechanism, and the ignition mechanism advancing means; fluid pressure means for shifting said controlling rod to start and stop the elevator, a manually operated valve in the car for controlling the shifting means, and a relief valve automatically actuated by the movement of the car for shifting the controlling rod to stop the apparatus and the engine when the car nears the ends of its path of travel.

27. An elevator hoisting apparatus, a car, an internal combustion engine, a pressure pump driven by the engine, a speed control valve, a centrifugal governor arranged to actuate said speed control valve, a clutch for connecting the engine with the hoisting apparatus, a brake for the hoisting apparatus, a fluid pressure control system comprising a reversible starting device for the engine, a fuel supply for the engine, and a valve controlling said fuel supply, a spark ignition mechanism, means for advancing said ignition mechanism, valves for the starting device, a valve for the clutch and brake, a controlling rod arranged to control the starting device valves, the clutch and brake valve, the current supply for the ignition mechanism, the ignition mechanism advancing means, and fuel supply valve; a fluid pressure cylinder and piston arranged to shift said controlling rod to start the elevator, springs arranged to return the controlling rod to its central position to stop the elevator, a manually operated valve in the car for admitting pressure to said cylinder to actuate the controlling rod, flexible tubes running to said car valve, and a relief valve automatically actuated by the movement of the car for releasing the pressure in said cylinder to allow said springs to return the controlling rod to its central position to stop the apparatus and the engine when the car nears the ends of its path of travel.

28. An elevator hoisting apparatus, a car, an internal combustion engine, a throttle valve for the engine, and a governor driven by the engine and arranged to control said throttle valve; a pressure pump driven by the engine, a fluid pressure control system comprising a starting device for the engine, a spark ignition mechanism and a controlling rod arranged to control the starting device and the current supply for the ignition mechanism; fluid pressure means for shifting said controlling rod to start and stop the elevator, and a manually operated valve in the car for controlling the shifting means.

29. An elevator hoisting apparatus, a car, an internal combustion engine, a pressure pump driven by the engine, a fluid pressure control system comprising a starting device for the engine, valves for the starting device, and a controlling rod arranged to control the starting device valves; a centrifugal governor driven by the engine and arranged to automatically modify the action of said valves, fluid pressure means for shifting said controlling rod to start and stop the elevator, and a manually operated valve in the car for controlling the shifting means.

30. An elevator hoisting apparatus, a car, an internal combustion engine, a pressure pump driven by the engine, a clutch for connecting the engine with the hoisting apparatus, a brake for the hoisting apparatus, a fluid pressure control system comprising a reversible starting device for the engine, a spark ignition mechanism, means for advancing said ignition mechanism, valves for the starting device, a valve for the clutch and brake, and a controlling rod arranged to control the starting device valves, the clutch and brake valve, the current supply for the ignition mechanism, and the ignition mechanism advancing means; a throttle valve for the engine, and a governor driven by the engine and arranged to control said throttle valve and to modify the action of said starting device valves and said clutch and brake valve; a fluid pressure cylinder and piston arranged to shift said controlling rod to start the elevator, compression springs arranged to return said rod to its central position to stop the elevator, and a manually operated valve in the car for controlling said cylinder and piston.

31. An elevator hoisting apparatus, an internal combustion engine, a pressure pump driven by the engine, a clutch for connecting the engine with the hoisting apparatus, a brake for the hoisting apparatus, a fluid pressure control system comprising a reversible starting device for the engine, a spark-ignition-mechanism, means for advancing said ignition mechanism, valves for the starting device, a valve for the clutch and brake, a throttle valve for the engine, and a controlling rod arranged to control the starting device valves, the clutch and brake valve, the current supply for the ignition mechanism, the ignition mechanism advancing means, and the throttle valve; an automatic speed control throttle valve, an inlet valve associated with the starting device valves, an inlet valve associated with the brake and clutch valve, a centrifugal governor driven by the engine and arranged to directly actuate the speed control throttle valve and to actuate said inlet valves through a lost motion connection; a fluid pressure cylinder and piston arranged to shift said controlling rod to start the elevator, a centering device arranged to return said rod to its central position and to stop the elevator, a manually operated valve in the car for controlling said cylinder and piston, and flexible tubes running to said car valve.

32. An elevator hoisting apparatus, a car, an internal combustion engine, a pressure pump driven by the engine, a fluid pressure control system comprising a starting device for the engine, a spark ignition mechanism and a controlling rod arranged to control the starting device and the current supply for the ignition mechanism; fluid pressure means for shifting said controlling rod to start and stop the elevator, a manually operated valve in the car for controlling the shifting means, and means automatically actuated by the movement of the apparatus for shifting said rod to stop the elevator at predetermined points.

33. An elevator hoisting apparatus, a car, an internal combustion engine, a pressure pump driven by the engine, a clutch for connecting the engine with the hoisting apparatus, a fluid pressure control system comprising a starting device for the engine, a spark ignition mechanism, means for advancing said ignition mechanism, valves for the starting device, a valve for the clutch, and a controlling rod arranged to control the starting device valves, the clutch valve, the current supply for the ignition mechanism, and the ignition mechanism advancing means; a fluid pressure cylinder and a piston arranged to shift said controlling rod to start and stop the elevator, a manually operated valve in the car for controlling said cylinder and piston, means actuated by the movement of the apparatus and other means actuated by the movement of the car for automatically shifting said rod to stop the engine and the hoisting apparatus when the car nears the ends of its path of travel.

34. An elevator hoisting apparatus, a car, an internal combustion engine, a throttle valve for the engine, and a governor driven by the engine and arranged to control said throttle valve; a pressure pump driven by the engine, a fluid pressure control system comprising a starting device for the engine, a spark ignition mechanism and a controlling rod arranged to control the starting device and the current supply for the ignition mechanism; fluid pressure means for shifting said controlling rod to start and stop the elevator, a manually operated valve in the car for controlling the shifting means, means actuated by the movement of the hoisting apparatus for automatically shifting back said controlling rod to stop the elevator, and means automatically actuated by the movement of the car for making the fluid pressure shifting means inoperative to stop the hoisting apparatus and the engine when the car nears the ends of its path of travel.

35. An elevator hoisting apparatus, a car, an internal combustion engine, a pressure pump driven by the engine, a fluid pressure control system comprising a starting device for the engine, valves for the starting device, and a controlling rod arranged to control the starting device valves; a centrifugal governor driven by the engine and arranged to automatically modify the action of said valves, fluid pressure means for shifting said controlling rod to start and stop the elevator, a manually operated valve in the car for controlling the shifting means, a mechanical stop motion device actuated by the movement of the hoisting apparatus for automatically shifting back said controlling rod to stop the elevator, and a relief valve automatically actuated by the movement of the car for making the fluid pressure shifting means inoperative to stop the hoisting apparatus and the engine when the car nears the ends of its path of travel.

36. An elevator hoisting apparatus, a car, an internal combustion engine, a pressure pump driven by the engine, a clutch for connecting the engine with the hoisting apparatus, a brake for the hoisting apparatus, a fluid pressure control system comprising a reversible starting device for the engine, a spark ignition mechanism, means for advancing said ignition mechanism, valves for the starting device, a valve for the clutch and brake, and a controlling rod arranged to control the starting device valves, the clutch and brake valve, the current supply for the ignition mechanism, and the ignition mechanism advancing means; a throttle valve for the engine, and a governor driven by the engine and arranged to control said throttle valve and to modify the action of said starting device valves and said clutches and brake valve; a fluid pressure cylinder and piston arranged to shift said controlling rod to start the elevator, compression springs arranged to return said rod to its central position to stop the elevator, and a manually operated valve in the car for controlling said cylinder and piston; an adjustable mechanical stop motion device automatically actuated by the movement of the hoisting apparatus for positively shifting back said controlling rod to stop the elevator, and a relief valve associated with said car valve for making the fluid pressure cylinder and piston device inoperative, and allowing said compression springs to return the controlling rod to its central position to stop the hoisting apparatus and the engine when the car nears the ends of its path of travel.

37. In an elevator, the combination of an internal combustion engine, a hoisting apparatus arranged to be driven thereby, a car, a clutch and a brake for said hoisting apparatus, a fluid pressure device for conjunctively actuating the clutch and releasing the brake, and manual means for controlling said device from the car.

38. In an elevator, the combination of an internal combustion engine, a hoisting apparatus arranged to be driven thereby, a car, means for controlling the engine, a clutch and a brake for said hoisting apparatus, a fluid pressure device for conjunctively actuating the engine-controlling means and clutch, and releasing the brake, and manual means for controlling said device from the car.

39. In an elevator, the combination of an internal combustion engine, a hoisting apparatus arranged to be driven thereby, a car, means driven by the engine for generating a fluid pressure supply, a fluid pressure motor, and manual means in the car for controlling said fluid pressure and causing said motor to assist the engine in starting the hoisting apparatus.

40. An elevator hoisting apparatus, a car, an internal combustion engine, a clutch arranged to connect and disconnect said apparatus with and from the engine, a brake for said apparatus, a fluid pressure control system for said apparatus and engine, said control system comprising a single device for simultaneously actuating the clutch and the brake, and a control valve in the car.

41. An elevator hoisting apparatus, a car, an internal combustion engine, a clutch arranged to connect and disconnect said apparatus with and from the engine, a brake for said apparatus, a fluid pressure control system for said apparatus and engine, said control system comprising a single device for simultaneously actuating the clutch and the brake, and manual means in the car for controlling said control system and actuating device.

42. An elevator hoisting apparatus, a car, an internal combustion engine, a fluid pressure control system for the hoisting apparatus and the engine, said control system comprising manually controlled means in the car for starting and stopping said engine and apparatus, and automatic means for stopping said engine and apparatus.

43. An elevator hoisting apparatus, a car, an internal combustion engine, a fluid pressure control system for the hoisting apparatus and the engine, said control system comprising manually controlled means in the car for starting and stopping said engine and apparatus, and automatic means for stopping said engine and apparatus in either direction without preventing them from being started by said manually controlled means in the opposite direction.

44. In an elevator, a hoisting apparatus, a car, an internal combustion engine, a centrifugal governor arranged to automatically control the speed thereof, and an automatic device arranged to stop the hoisting apparatus and the engine when the car nears the ends of its travel.

45. In an elevator, a hoisting apparatus, a car, an internal combustion engine, means driven by the engine for generating a fluid pressure supply, a reversible fluid pressure motor positively connected with the engine, and manual means in the car for connecting and disconnecting the fluid pressure with and from the motor to cause said motor to start the engine in either direction and to assist the engine in starting and accelerating the apparatus.

46. In an elevator, a hoisting apparatus, a car, an internal combustion engine, means driven by the engine for generating a fluid pressure supply, a reversible fluid pressure motor positively connected with the engine, and manually controlled means in the car for connecting and disconnecting the fluid pressure with and from the motor to cause said motor to start the engine in either direction and to assist the engine in starting and accelerating the apparatus.

47. A hoisting apparatus, an internal combustion engine, a fluid pressure control system therefor, said system comprising manual means for controlling the starting and stopping of said apparatus and engine, and automatic means for stopping said apparatus and engine.

48. In an elevator, a hoisting apparatus, a car, an internal combustion engine, a fluid pressure control system therefor, said system comprising manual means for controlling the starting and stopping of said apparatus and engine, and automatic means for stopping said apparatus and engine when said car reaches predetermined points in its travel.

49. A hoisting apparatus, an internal combustion engine, a fluid pressure control system therefor, said system comprising manual means for controlling the starting and stopping of said apparatus and engine, means automatically actuated by the movement of the hoisting apparatus, and other means automatically actuated by the movement of the car for stopping said apparatus and engine when the car reaches predetermined points in its path of travel.

50. In an elevator, a hoisting apparatus, a car, an internal combustion engine, a fluid pressure control system therefor, a centrifugal governor arranged to maintain the speed of the engine at a constant rate; said control system comprising manual means for controlling the starting and stopping of the apparatus and engine, means automatically actuated by the movement of the hoisting apparatus, and other means automatically actuated by the movement of the car for starting said apparatus and engine when the car reaches predetermined points in its path of travel.

51. In an elevator, a hoisting apparatus, a car, a fluid pressure system arranged to start and control the engine, a centrifugal governor arranged to maintain the speed of the engine at a constant rate; said fluid pressure system comprising a movable controlling member, means manually controlled from the car for actuating said controlling member, and a mechanical connection between said governor and the movable controlling member.

52. In an elevator, a hoisting apparatus, a car, a fluid pressure system arranged to start and to control the engine, a centrifugal governor arranged to maintain the speed of the engine at a constant rate; said fluid pressure system comprising a movable controlling member, a manually actuated valve in the car for actuating said controlling member, and a mechanical connection between said governor and the movable controlling member arranged to cause the governor to automatically actuate said controlling member.

53. In an elevator, a hoisting apparatus, a car, an internal combustion engine, a sparking device for the engine, an electrical supply therefor, a fluid pressure control system for the engine, said system comprising a control valve in the car and means for controlling the electrical supply; and means for stopping the engine and positively cutting off said electrical supply from the sparking device.

54. In an elevator, a hoisting apparatus, a car, an internal combustion engine, a fluid pressure control system therefor, said system comprising a control valve in the car, and means for carrying a fuel supply to the engine; and means for stopping the engine and positively cutting off the fuel supply from the engine.

55. In an elevator, a hoisting apparatus, a car, an internal combustion engine, a sparking device for the engine, an electrical supply therefor, a fluid pressure control system for the engine, said system comprising a manually operated control valve in the car, and means for carrying a fuel supply to the engine; and automatic means for stopping the engine and positively cutting off the electrical supply from the sparking device and the fuel supply from the engine.

In testimony whereof I have signed my name to this specification in the presence of two subscribing witnesses.

CHARLES O. PEARSON.

Witnesses:
ELLA TUCH,
HENRY C. DATER.

---

Copies of this patent may be obtained for five cents each, by addressing the "Commissioner of Patents, Washington, D. C."